(12) United States Patent
Steklenski et al.

(10) Patent No.: US 6,852,987 B2
(45) Date of Patent: Feb. 8, 2005

(54) ELONGATED COMPUTED RADIOGRAPHY CASSETTE

(75) Inventors: David J. Steklenski, Rochester, NY (US); David H. Foos, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 694 days.

(21) Appl. No.: 09/742,509

(22) Filed: Dec. 20, 2000

(65) Prior Publication Data

US 2002/0109102 A1 Aug. 15, 2002

Related U.S. Application Data

(60) Provisional application No. 60/254,119, filed on Dec. 8, 2000.

(51) Int. Cl.⁷ .............................................. G03B 42/04
(52) U.S. Cl. .................... 250/484.4; 250/583; 378/174; 378/167
(58) Field of Search .......................... 250/484.4, 485.1, 250/581, 583, 582; 328/167, 182, 188, 172, 174

(56) References Cited

U.S. PATENT DOCUMENTS

| 3,725,703 | A | | 4/1973 | Bucky |
| 3,774,045 | A | | 11/1973 | Trott |
| 4,249,818 | A | * | 2/1981 | Buldini ....................... 378/182 |
| 4,457,010 | A | * | 6/1984 | Jenkins et al. .............. 378/167 |
| 4,827,136 | A | * | 5/1989 | Bishop et al. ........... 250/484.4 |
| 5,065,866 | A | * | 11/1991 | Boutet et al. ............... 206/455 |
| 5,111,045 | A | | 5/1992 | Konno et al. |
| 5,130,541 | A | | 7/1992 | Kawai |
| 5,330,309 | A | | 7/1994 | Brahm et al. |
| 5,574,767 | A | * | 11/1996 | Hayes ........................ 378/167 |
| 5,986,279 | A | | 11/1999 | Dewaele |

FOREIGN PATENT DOCUMENTS

| EP | EP 394564 A | * | 10/1990 | .......... G03B/42/04 |
| EP | 0 919 856 A1 | | 6/1999 | |
| JP | JP 05034848 A | * | 2/1993 | .......... G03B/42/04 |

* cited by examiner

Primary Examiner—Constantine Hannaher
Assistant Examiner—Albert Gagliardi
(74) Attorney, Agent, or Firm—William F. Noval

(57) ABSTRACT

A storage phosphor cassette for use in recording radiographic images of elongated objects. The cassette includes: first and second storage phosphor plates having first and second length dimensions, a shell having first and second opposite open ends; a first assembly for detachably mounting said first storage phosphor plate in said shell from said first open end; and a second assembly for detachably mounting said second storage phosphor plate in said shell from said second open end, wherein said first and second storage phosphor plates are mounted in said shell such that they form a substantially continuous storage phosphor composite for recording an elongated radiographic image.

5 Claims, 7 Drawing Sheets

ELONGATED COMPUTED RADIOGRAPHY CASSETTE

CROSS REFERENCE TO RELATED APPLICATIONS

This non-Provisional application claims the benefit under 35 USC§119(e) of the earlier filing date of Provisional Application USSN 60/254,119, filed on Dec. 8, 2000, titled: ELONGATED COMPUTED RADIOGRAPHY CASSETTE, inventors: David L. Steklenski, David H. Foos.

FIELD OF THE INVENTION

This invention relates in general to medical imaging and more particularly relates to the use in computed radiography (CR) of an elongated CR cassette for imaging elongated body regions, such as the full spine or the leg.

BACKGROUND OF THE INVENTION

Conventional size radiographic image acquisition units are limited in size and unsuitable for imaging elongated body regions such as the full spine or the leg. The largest conventional radiographic film and radiographic computed radiography plates used in chest radiography are 35×43 cm. (14×7 in.). When it is necessary to obtain a radiographic image of a full spine or leg, several approaches have been used. If film/screen technology is used, either an extra long, non-standard radiographic film is used, or as disclosed in U.S. Pat. No. 3,774,045, issued Nov. 20, 1973, inventor Trott and U.S. Pat. No. 3,725,703, issued Apr. 3, 1973, inventor Bucky, cassette or cart is provided for holding a plurality of overlapping conventional sized film cassettes or packs. In the case of a special elongated film, the cost of the film and its processing is substantially greater than the cost of the conventional sized film. In the case of multiple film solutions, the films must be taped together to obtain the full length radiographic image. This introduces overlap and alignment problems.

Similar solutions have been proposed when computed radiography plates are used. Thus, U.S. Pat. No. 5,130,541, issued Jul. 14, 1992, inventor Kawai discloses a self enclosed CR unit using elongated CR plates that are exposed, read, erased and reused within the unit. U.S. Pat. No. 5,111,045 discloses a self enclosed unit using conventional sized CR plates that are exposed, read, erased and reused within the unit. When an elongated body region is imaged, first and second overlapping CR plates are positioned at the exposure station, exposed and then processed. Both of these solutions are disadvantageous in the use of an expensive, heavy, self-enclosed unit that is unsuitable for use when a patient is unable to use the unit due to physical disability or when admitted to a hospital emergency room, intensive care unit or surgical suite.

EP Patent application EPO 919856A1, published Feb. 6, 1999, inventor Dewaile et al. discloses an assembly for recording a radiographic image of an elongated body including a plurality of CR cassettes holding conventional sized CR plates that are held in staggered arrangement so that the length of the staggered arrangement is equal to at least the length of the elongated body. After exposure, the CR plates are read individually and the read electronic images are stitched together to form the entire image of the elongated body. This technique is disadvantageous in requiring the use of a special assembly to hold the CR cassettes. U.S. Pat. No. 5,986,279, issued Nov. 16, 1999, inventor Dewaile, discloses an elongated CR cassette holding a plurality of overlapping or non-overlapping CR screens. After exposure, the CR screens are removed from the elongated cassette, put into "normal" sized cassettes, and applied to a read out device that is able to read out normal sized cassettes. This technique is disadvantageous in the time and expense involved in loading and unloading the elongated cassette as well as in the subsequent handling of individual CR cassettes to enable CR screen readout.

There is thus a need for a solution to these problems.

SUMMARY OF THE INVENTION

According to the present invention, there is provided a solution to the problems of the prior art.

According to a feature of the present invention, there is provided a storage phosphor cassette for use in recording radiographic images of elongated objects comprising: first and second storage phosphor plates having first and second length dimensions, a shell having first and second opposite open ends, a first assembly for detachably mounting said first storage phosphor plate in said shell from said first open end; and a second assembly for detachably mounting said second storage phosphor plate in said shell from said second open end, wherein said first and second storage phosphor plates are mounted in said shell such that they form a substantially continuous storage phosphor composite for recording an elongated radiographic image.

ADVANTAGEOUS EFFECT OF THE INVENTION

The invention has the following advantages.
1. Radiographic images of an elongated object can be made in a single exposure using conventional size CR plates.
2. The CR plates are exposed to a radiographic image in the same plane, obviating the need for stacking multiple cassettes and performing complex corrections or multi-plane images.
3. The CR plates are not handled manually and are read automatically thus minimizing degradation of the CR plate and resultant image degradation.

DETAILED DESCRIPTION OF THE INVENTION

In general, the present invention relates to the radiographic imaging of an elongate object such as the full spine (for diagnosing scoliosis, for example) or leg of a human subject.

Two contiguous CR plates contained in an elongated cassette are exposed to a radiographic image of an elongate object to produce a latent image stored in the CR plates. The CR plates are removably mounted in the cassette and are sequentially fed to a CR reader where the latent radiographic images are converted to two electronic images which are combined to form an elongated image. The elongate image can be displayed on an electronic display or printed out on hard copy media.

Figure 1:
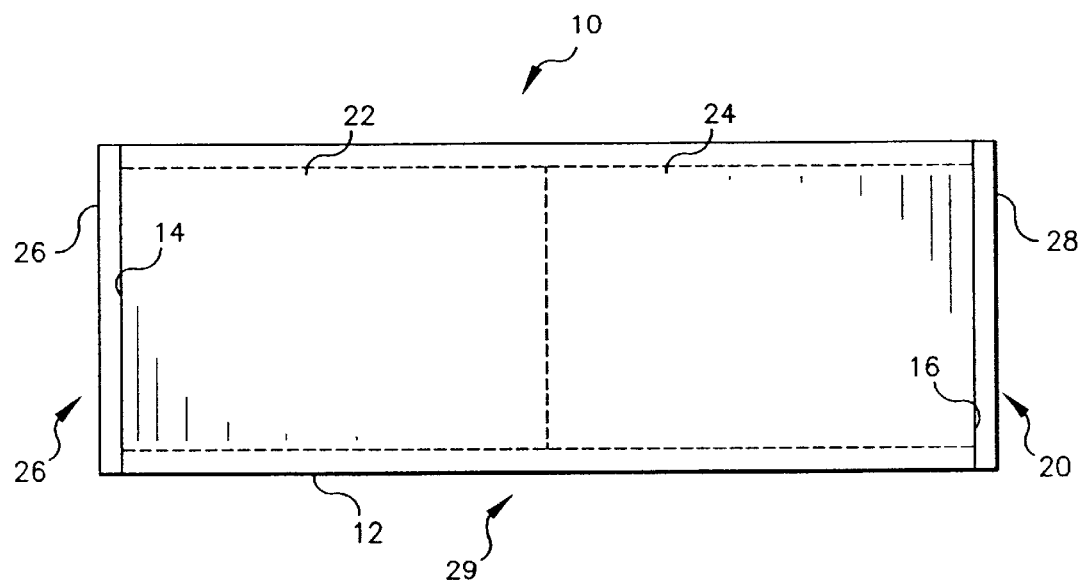
FIG. 1 is a diagrammatic view of a CR cassette acording to the present invention.
Figure 2:
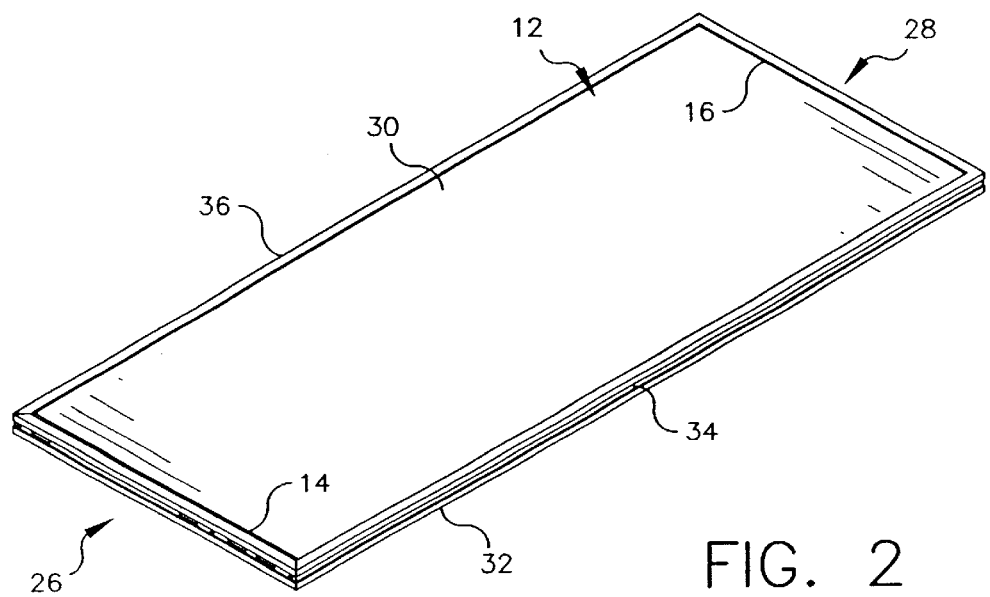
FIG. 2 is a diagrammatic view of a radiographic image system using the present invention.

Referring now to FIG. 1 and 2, there is shown an embodiment of the present invention. As shown, storage phosphor cassette 10 includes an elongate rectangular shell 12 having first and second open ends 14 and 16. A first storage phosphor plate assembly 18 is detachably mounted in shell 12 from the first open end 14. A second storage phosphor plate assembly 20 is detachably mounted on shell 12 from the second open end 16. Each assembly 18, 20 includes a storage phosphor plate 22, 24 and a support and latching assembly 26, 28. Plates 22, 24 are butt joined or overlapped in the central region 29 of shell 12. Shell 12 includes upper and lower members 30, 32 and side extrusions 34, 36 which together form a rectangular shell.

Figure 3:
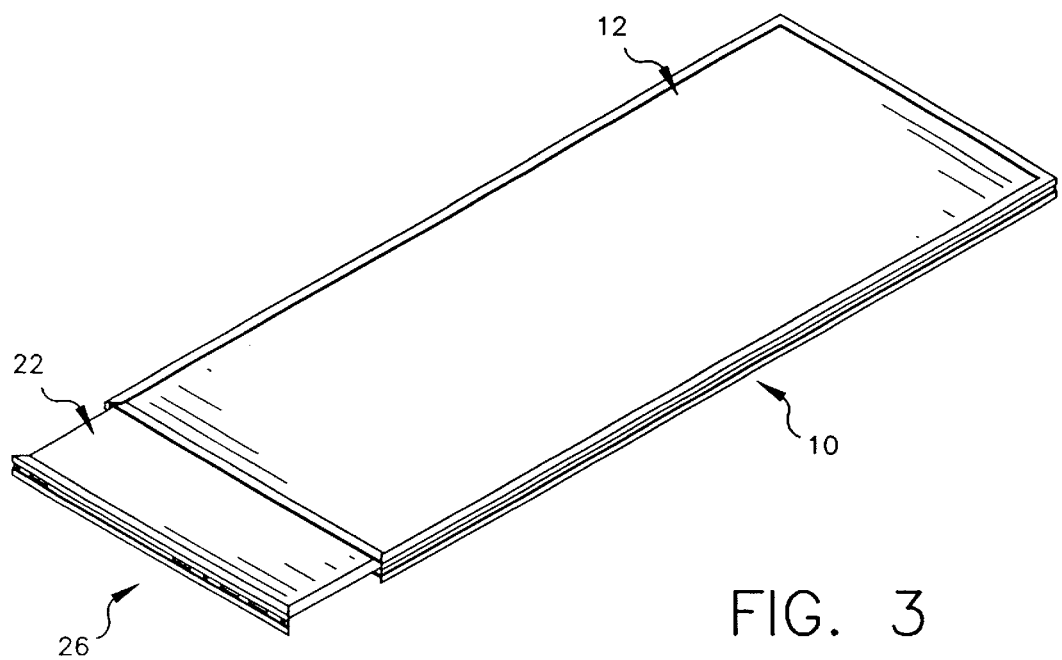
FIGS. 3–13 are views illustrating details of the present invention.

FIG. 3 shows first storage phosphor assembly 18 partially detached from cassette 10 at a reading device (not shown).

Figure 4:
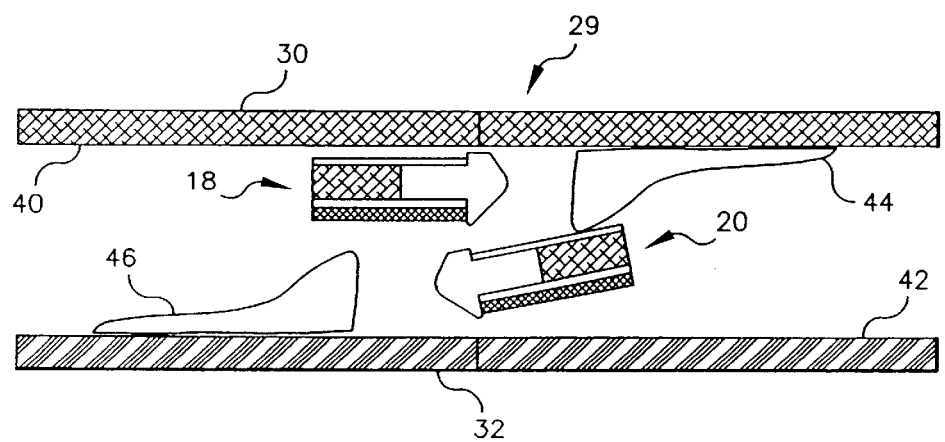

FIG. 4 shows a cross-section of cassette 10 showing upper and lower members 30, 32 having respective opposed inner surfaces 40, 42 including deflectors 44, 46 extending therefrom for guiding the inner ends of assemblies 18, 20 to overlap. This results in an overlapping of storage phosphor plates 22 and 24 to form a composite storage phosphor plate for elongate radiographic images, such as the human spine and leg.

Figure 5:
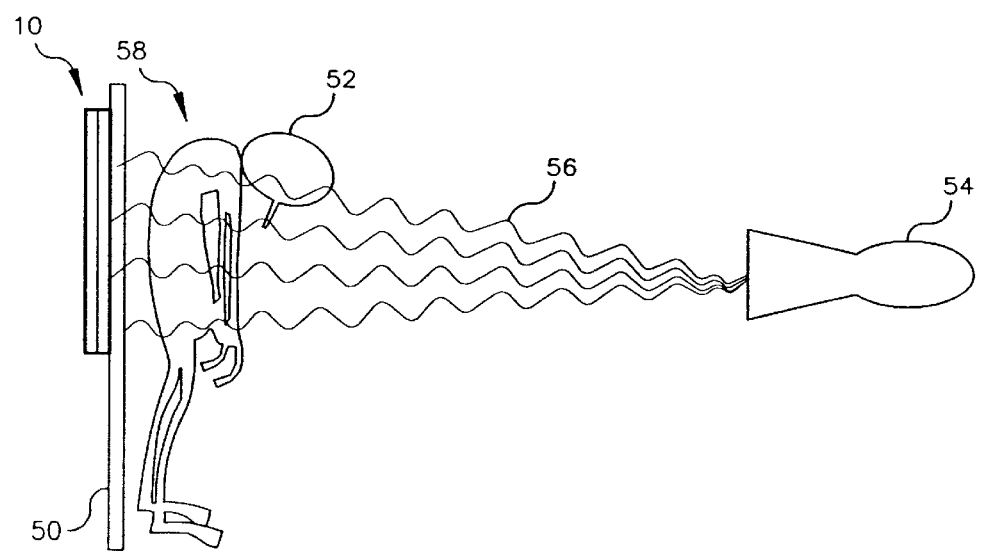

FIG. 5 shows a radiographic imaging system using the elongated storage phosphor cassette of the present invention. As shown, cassette 10 is mounted on support 50. Patient 52 is positioned between cassette 10 and a source 54 of X-rays. An X-ray beam 56 from source 54 penetrates the torso region 58 of patient 52 to record a latent radiographic image thereof in the composite storage phosphor plates of cassette 10. The cassette 10 is removed and the first storage phosphor assembly placed in a reading device (described later). The first plate is read and the first electronic image stored. The cassette is removed from the reading device, inverted and the second storage phosphor assembly is placed in the reading device. The second storage phosphor plate is read and the second electronic image is stored. The two images can then be processed into a single image if so desired.

Figure 6:
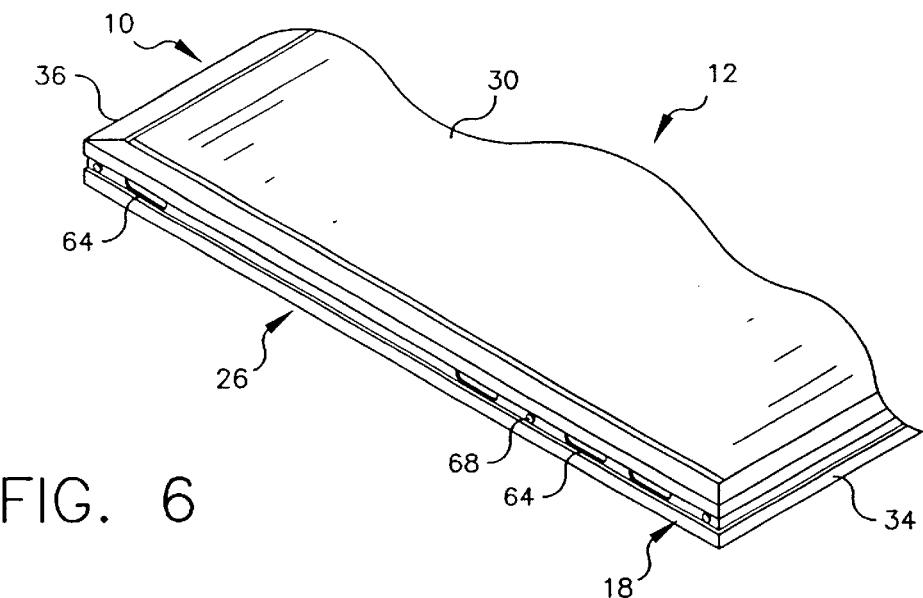
Figure 7:
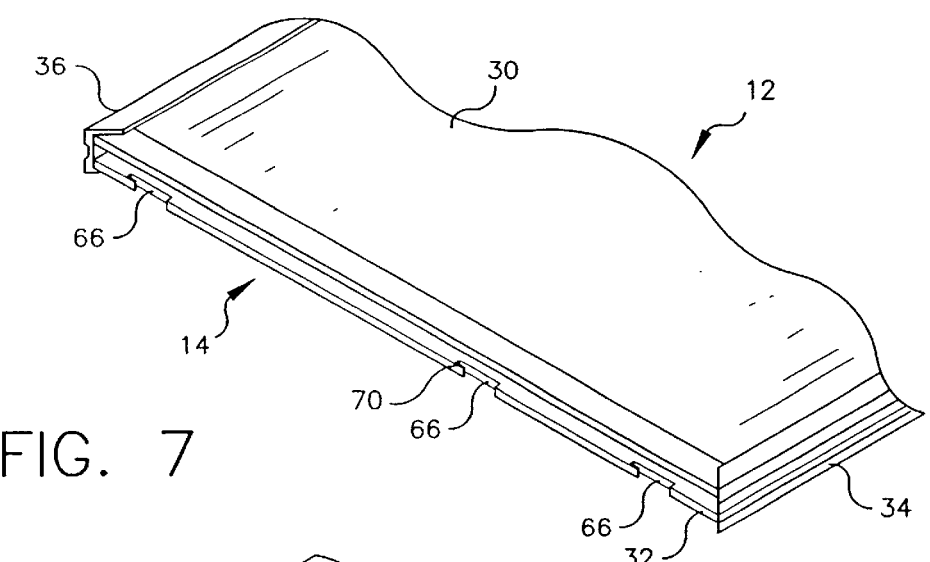
Figure 8:
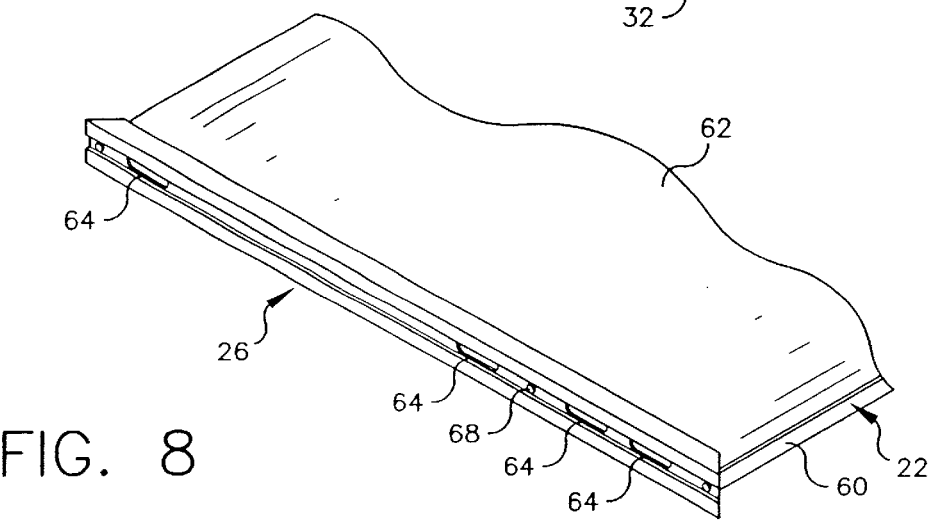
Figure 9:
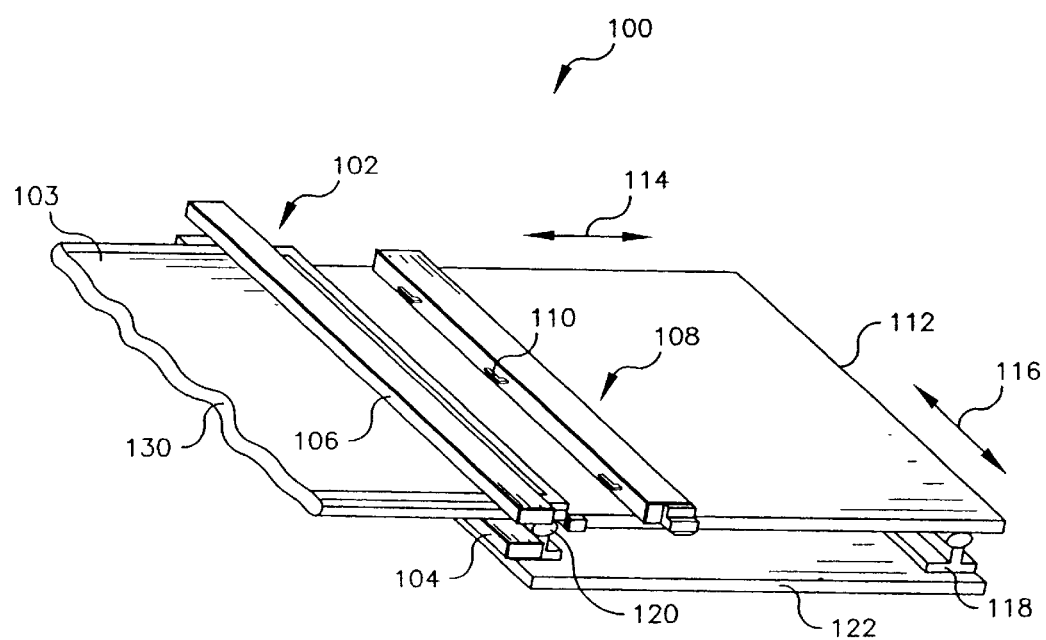

FIGS. 6, 7 and 8 show in greater detail the components of storage phosphor cassette 10. As shown, cassette 10 is viewed from one end showing first storage phosphor assembly 18. It will be understood that the other end of cassette 10 is similar in structure but showing storage phosphor assembly 20. Storage phosphor plate assembly 18 has a storage phosphor plate 22 including an aluminum support plate 60 carrying a storage phosphor screen 62. Plate 22 is cantilevered from assembly 26 which has a plurality of openings 64 and an opening 68 to be explained later (FIG. 8). Shell 12 has a lower member 32 having notches 66 with set back portions 70 at each open end 14, 16. A locking mechanism in assembly 26 locks storage phosphor plate assembly 18 into shell 12.

Referring now to FIGS. 9–13, there is shown a reader device for reading a storage phosphor plate assembly. As shown, storage phosphor reading device 100 includes a cassette receiving station 102 for receiving a cassette 103 containing a storage phosphor plate that stores a latent radiographic image. Station 102 has clamps 104, 106 for clamping the end of cassette 103. Extractor bar assembly 108 includes hooks 110 for removing and replacing a storage phosphor assembly relative to cassette 103. Assembly 108 is mounted on stage 112 for movement in opposite directions 114. Stage 112 is mounted for movement in opposite directions 116 on rails 118, 120 on support 122.

Figure 10:
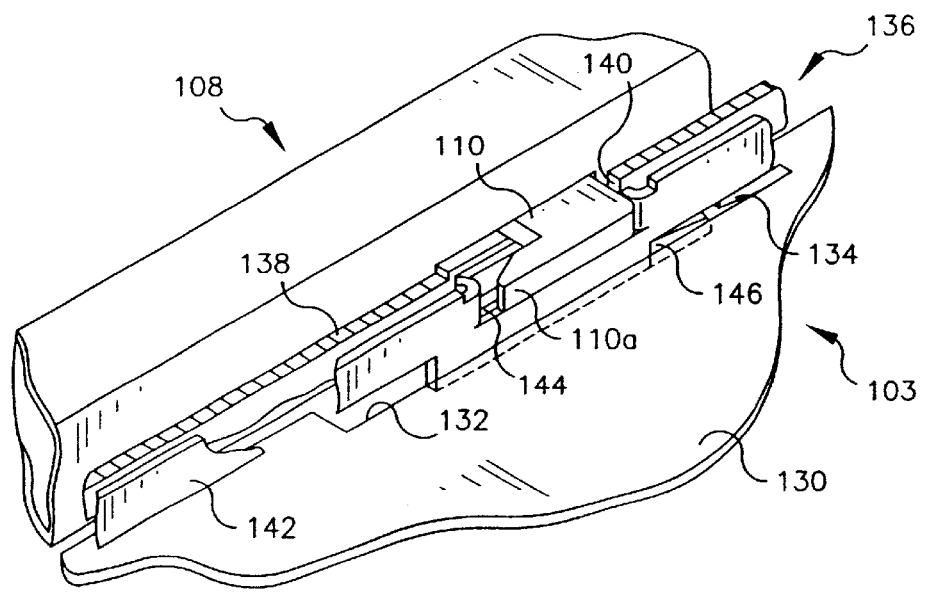
Figure 11:
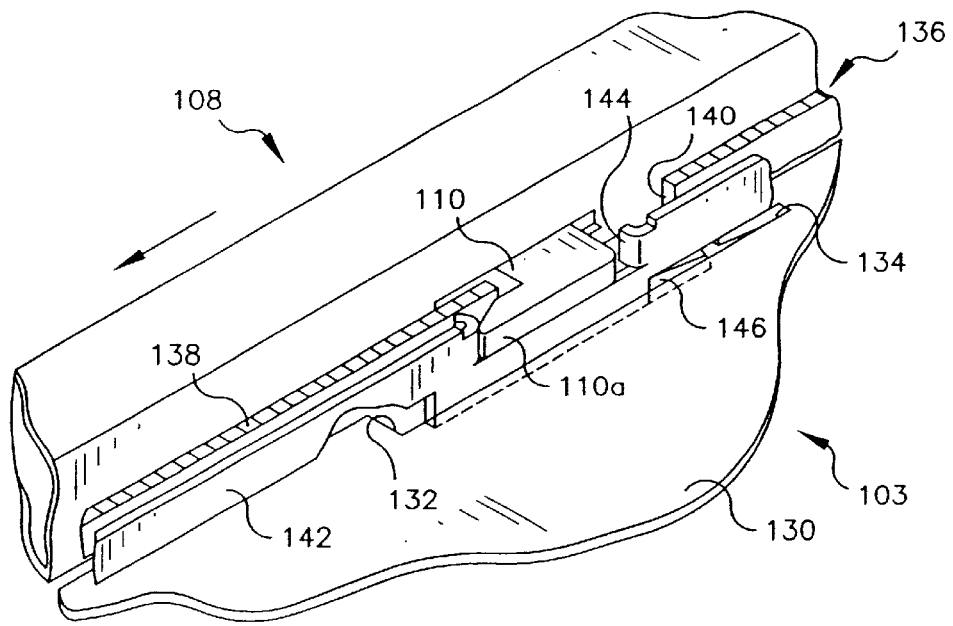

As shown in FIGS. 10 and 11, the lower member 130 of cassette 103 has cut-outs 132 with slots 134. The support and latch assembly 136 of the storage phosphor plate assembly contained in cassette 103 has a front wall 138 with openings 140 through which hooks 110 project. Assembly 136 has a latch 142 with cutouts 144 and angled tabs 146. In FIG. 10, the storage phosphor plate assembly is locked in cassette 103 by the mating of tabs 146 of latch 142 with slots 134 of cutouts 132. In FIG. 11, hooks 110 with bearing portion 110a of extractor bar assembly 108 have been moved to the left to unlatch latch 142 from lower member 130 of cassette 103. Hooks 110 grab front wall 138 of the storage phosphor plate assembly to allow removal of the assembly from cassette 103.

Figure 13:
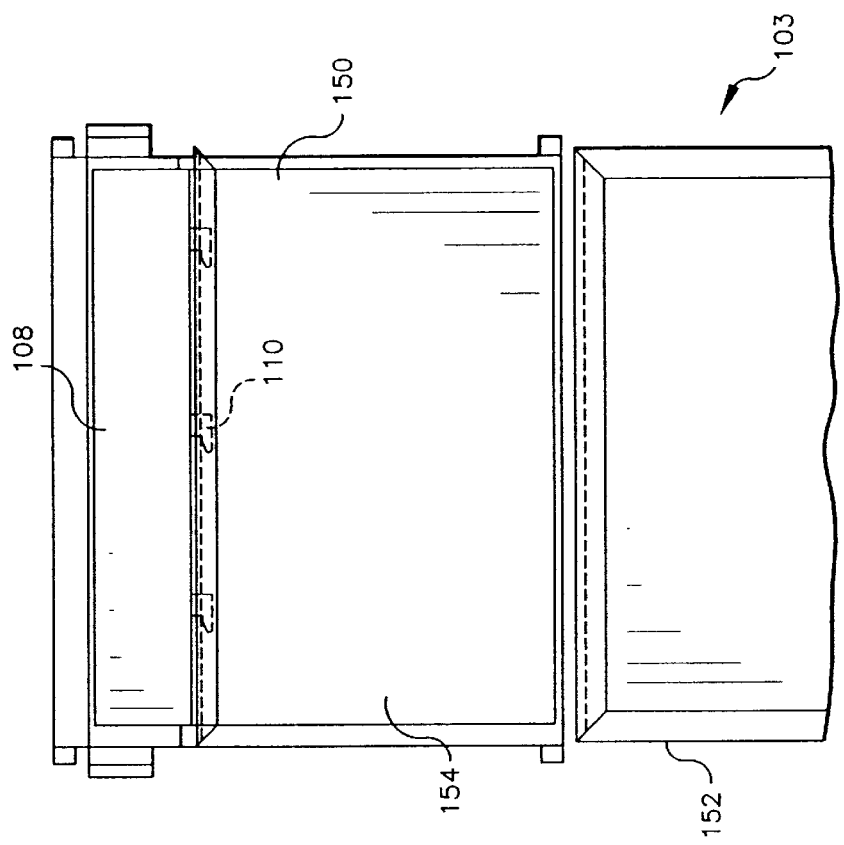
Figure 12:
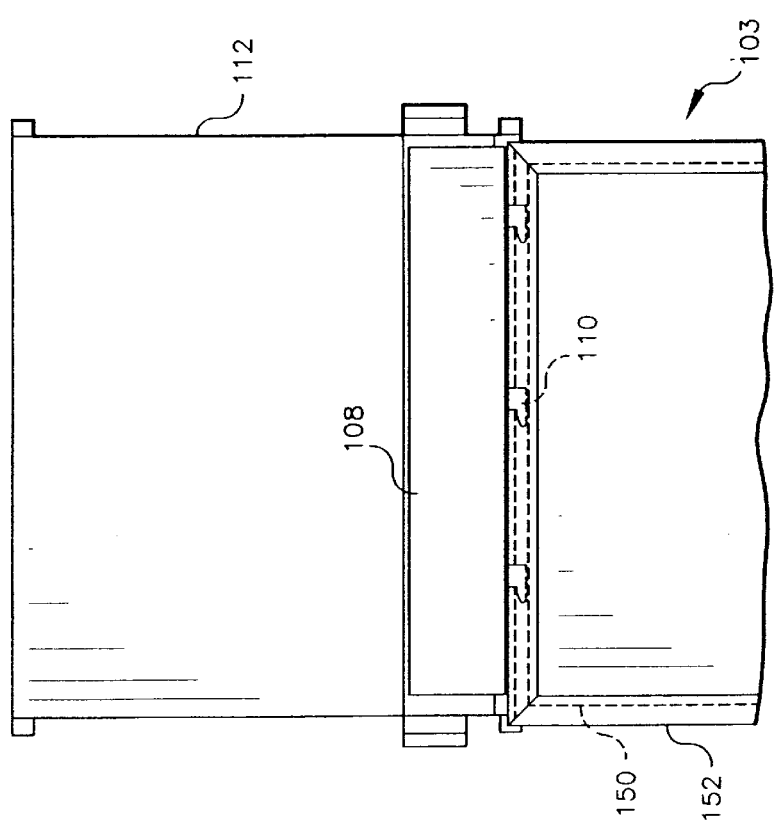

As shown in FIG. 12, extractor bar assembly 108 has engaged storage phosphor plate assembly 150 of cassette 103 and unlatched assembly 150 from cassette shell 152 of cassette 103. In FIG. 13, extractor bar assembly 108 has completely removed storage phosphor plate assembly 150 from shell 152 of cassette 103. Assembly 108 and assembly 150 are then moved in the direction 116 so that a laser scanner (not shown) reads the latent radiographic image stored in the storage phosphor screen 154 of storage phosphor plate assembly 150. U.S. Pat. No. 5,276,333, issued Jan. 4, 1994, inventor Robertson, discloses an exemplary X-ray cassette having a single removable storage phosphor assembly. U.S. Pat. No. 5,330,309, issued Jul. 19, 1994, inventors Brahm et al., discloses an exemplary reader having cassette locating and unlatching mechanism.

It will be understood that the present invention includes other types of elongated cassettes having removable storage phosphor plate assemblies. Thus, this cassette shell could have a three-sided, U shaped with an open bottom in which the storage phosphor plate assemblies close off the open bottom. Other type of latching mechanisms can also be used.

The invention has been described in detail with particular reference to certain preferred embodiments thereof, but it will be understood that variations and modifications can be effected within the spirit and scope of the invention.

| PARTS LIST | |
|---|---|
| 10 | storage phosphor cassette |
| 12 | elongated rectangular shell |
| 14 | first open end |
| 16 | second open end |
| 18 | first phosphor plate assembly |
| 20 | second phosphor plate assembly |
| 22, 24 | storage phosphor plate |
| 26, 28 | latching assembly |
| 29 | central region |
| 30, 32 | upper and lower members |
| 34, 36 | side extrusions |
| 40, 42 | inner surfaces |
| 44, 46 | deflectors |
| 50 | support |
| 52 | patient |
| 54 | source |
| 56 | X-ray beam |
| 58 | torso region |
| 60 | aluminum support plate |
| 62 | storage phosphor assembly |
| 64 | openings |
| 66 | notches |
| 68 | opening |
| 70 | back portions |
| 100 | storage phosphor reading device |
| 102 | cassette receiving station |
| 103 | cassette |
| 104, 106 | clamps |
| 108 | assembly |
| 110, 110a | hooks |

-continued

PARTS LIST

| | |
|---|---|
| 112 | stage |
| 114 | opposite direction |
| 116 | opposite direction |
| 118, 120 | rails |
| 122 | support |
| 130 | lower member |
| 132 | cutouts |
| 134 | slots |
| 136 | assembly |
| 138 | front wall |
| 140 | openings |
| 142 | unlatch latch |
| 144 | cutouts |
| 146 | angled tabs |
| 150 | plate assembly |
| 152 | cassette shell |

What is claimed is:

1. A storage phosphor cassette for use in recording radiographic images of elongated objects comprising:

first and second storage phosphor plates having first and second length dimensions;

a shell having first and second opposite open ends, a first assembly for detachably mounting said first storage phosphor plate in said shell from said first open end, and a second assembly for detachably mounting said second storage phosphor plate in said shell from said second open end, wherein said first and second storage phosphor plates are mounted in said shell such that they form a substantially continuous storage phosphor composite for recording an elongated radiographic image.

2. The cassette of claim 1 wherein said first and second storage phosphor plates are substantially rigid.

3. The cassette of claim 1 wherein said shell has opposed inner surfaces and a central region and including deflectors on said opposed inner surfaces for guiding said inner ends of said first and second storage phosphor plates to overlap.

4. The cassette of claim 1 wherein said shell is rectangular having upper and lower members and adjoining side members.

5. The cassette of claim 1 wherein said shell is U-shaped having an upper member adjoining side members and an open bottom and wherein said first and second storage phosphor plates close off said open bottom.

* * * * *